United States Patent
Bailiang et al.

(10) Patent No.: US 9,360,340 B1
(45) Date of Patent: Jun. 7, 2016

(54) CUSTOMIZABLE PRESENTATION OF NAVIGATION DIRECTIONS

(71) Applicant: GOOGLE INC., Mountain View, CA (US)

(72) Inventors: Zhou Bailiang, Balgowlah (AU); Robertus Christianus Elisabeth Mariet, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 128 days.

(21) Appl. No.: 14/265,753

(22) Filed: Apr. 30, 2014

(51) Int. Cl.
*G01C 21/36* (2006.01)

(52) U.S. Cl.
CPC .......... *G01C 21/367* (2013.01); *G01C 21/3626* (2013.01)

(58) Field of Classification Search
CPC ............... G01C 21/36; G01C 21/3626; G01C 21/3629; G01C 21/3641; G01C 21/3655; G01C 21/367
USPC .................................................. 701/431, 440
See application file for complete search history.

(56) References Cited

U.S. PATENT DOCUMENTS

| | | | | |
|---|---|---|---|---|
| 7,054,745 B1 * | 5/2006 | Couckuyt | ............... | G01C 21/26 340/995.27 |
| 7,239,959 B2 * | 7/2007 | Rasmussen | ........ | G01C 21/3641 342/357.57 |
| 7,920,963 B2 * | 4/2011 | Jouline | ................... | G01C 21/36 701/420 |
| 8,306,749 B1 * | 11/2012 | Petersen | ............ | G01C 21/3641 340/988 |
| 8,706,415 B2 * | 4/2014 | Su | ....................... | G01C 21/3632 701/400 |
| 2005/0234617 A1 * | 10/2005 | Kynast | ............... | G01C 21/3641 701/36 |
| 2006/0212442 A1 * | 9/2006 | Conrad | ............ | G06F 17/30026 |
| 2008/0037730 A1 * | 2/2008 | Cubillo | .................. | G06Q 10/10 379/88.18 |
| 2010/0324818 A1 * | 12/2010 | Gellatly | ............. | G01C 21/3641 701/431 |
| 2011/0144901 A1 * | 6/2011 | Wang | ................. | G01C 21/3629 701/533 |
| 2011/0178697 A1 * | 7/2011 | Mincey | .............. | G01C 21/3644 701/532 |
| 2013/0317746 A1 * | 11/2013 | Babetski | ............ | G01C 21/3641 701/537 |
| 2014/0100780 A1 * | 4/2014 | Caine | ..................... | G01C 21/32 701/533 |

OTHER PUBLICATIONS

Garmin, nuvi 3700 Series Owner's Manual, Jun. 2010, Garmin Ltd.*
Volvo, Volvo Navigation System, 2012, Volvo Car Corporation.*
Google Maps and Earth Help Forum, "How can I send customized driving directions to my android phone navigation app?", 2010, Misc. <https://productforums.google.com/forum/#!topic/maps/5pLAcHV-_w4>.*

(Continued)

*Primary Examiner* — John Q Nguyen
*Assistant Examiner* — Nadeem Odeh
(74) *Attorney, Agent, or Firm* — Marshall, Gerstein & Borun LLP

(57) ABSTRACT

Presentation of navigation directions in mapping applications is customized by obtaining navigation instructions that direct a user from a starting point to a destination. The navigation instructions are displayed via a user interface. For each of the navigation instructions, an individually operable user control for specifying an instruction-specific presentation rule is provided. Instruction-specific presentation rules are received prior to the user departing from the starting point toward the destination. The navigation instructions are presented during navigation in accordance with the received instruction-specific presentation rules.

13 Claims, 6 Drawing Sheets

(56) References Cited

OTHER PUBLICATIONS

Forbes Tech, Google Maps Returns to iOS, Now with Voice Guided Turn-by-Turn Navigation, 2012, Forbes.com <http://www.forbes.com/sites/anthonykosner/2012/12/13/google-maps-returns-to-ios-now-with-voice-guided-turn-by-turn-navigation/>.*

Kazmucha, How to get turn-by-turn, Street View, transit directions, and more with Google Maps for iPhone, Dec. 2012, iMore.com <http://www.imore.com/how-get-started-google-maps-iphone>.*

Casserly, How to sync a Google Map route between your PC and smartphone or tablet, Jan. 2014, PCAdvisor.co.uk <http://www.pcadvisor.co.uk/how-to/software/how-sync-google-map-routes-between-devices-3495375/>.*

Henry, The Best Turn-By-Turn Navigation App for Android, Jan. 2013, LifeHacker.com <http://lifehacker.com/5870515/the-best-turn-by-turn-navigation-app-for-android>.*

* cited by examiner

From North Sydney to Manly

200

250 → Select All

| | | | 220 | 230 | 240 | |
|---|---|---|---|---|---|---|
| 202 → ↑ | 1. | Head south on Miller St towards Pacific Hwy | 22 m | 🔊 | | 242 |
| 204 → ⬑ | 2. | Take the 1st left onto Pacific Hwy | 210 m | 🔊 | X2 | |
| 206 → ⬑ | 3. | Turn left towards Walker St | 22 m | 🔊 | | |
| 208 → ⬑ | 4. | Turn left onto Walker St | 350 m | 🔊 | | |
| 210 → ⬏ | 5. | Turn right onto Berry St | 67 m | 🔊 | | |
| 212 → ⋏ | 6. | Slight left onto the ramp to Crows Nest/Epping/Chatswood | 350 m | | | |
| 214 → ⋏ | 7. | Merge onto M1 | 350 m | 🔊 | | |
| 216 → ⬏ | 8. | Take exit Military Road on the right towards Metroad 10/Mosman/Manly | 240 m | 🔊 | | |
| 218 → ⬏ | 9. | Turn right onto Military Rd | 350 m | 🔊 | | |

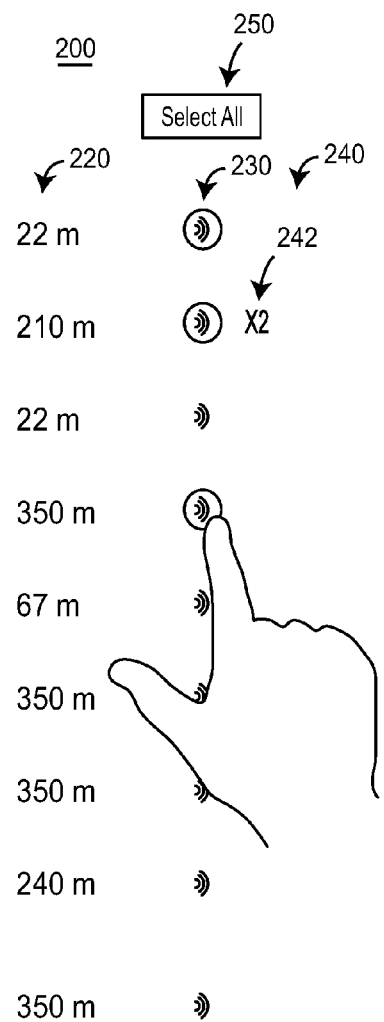

*FIG. 4*

CUSTOMIZABLE PRESENTATION OF NAVIGATION DIRECTIONS

FIELD OF THE DISCLOSURE

The present disclosure relates to digital mapping data and, more particularly, to providing customizable presentation of navigation directions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, software applications executing in computers, smartphones, etc. or embedded devices generate step-by-step navigation directions. Typically, a user specifies the starting point and the destination, and a software application displays the directions immediately and/or as the user travels from the starting point and the destination. In some cases, the software applications also produce voice announcements corresponding to the navigation directions.

SUMMARY

A navigation system implemented in a network server and/or a user device provides navigation instructions to a user based on the user's selections of instruction-specific presentation rules. A user can request step-by-step navigation instructions for travelling from a starting point, which can be defined explicitly or implicitly, to a destination. The navigation system can generate the instructions on the network server or locally on the user device. Each navigation instruction describes a maneuver which occurs at a location (e.g., "Turn left onto Walker Street"). For each navigation instruction, the user may indicate whether the instruction will be presented when the user arrives at the corresponding location. The presentation of a navigation instruction can include an audio announcement, presentation of text and/or a graphic, a vibration signal, etc. In some embodiments, the user can also indicate a number of times the navigation instruction will be presented, a level of detail for the navigation instruction (e.g., expressed as one of several discrete level or as the period of time during the instruction will be presented). Once the user has made a selection for each navigation instruction (or accepted certain default selections), the navigation system creates a "playlist." When the user begins travelling to the requested destination, the navigation instructions are presented according to the playlist.

In particular, an example embodiment of the techniques of the present disclosure is a method for customizing presentation of navigation directions in mapping applications. The method can be executed on one or more processors. The method includes obtaining navigation instructions that direct a user from a starting point to a destination. The method further includes displaying the navigation instructions via a user interface and providing, for each of the navigation instructions, an individually operable user control for specifying an instruction-specific presentation rule. Still further, the method includes receiving instruction-specific presentation rules in accordance with which the navigation instructions are presented during navigation.

Another embodiment of these techniques is a client computing device including a user interface, one or more processors coupled to a communication interface and the user interface; and a non-transitory computer-readable memory storing instructions. When executed by the one or more processors, the instructions cause the client device to obtain navigation instructions which direct a user from a starting point to a destination, receive a instruction-specific presentation rules for the navigation instructions via the user interface, and present the navigation instructions in accordance with the received instruction-specific presentation rules.

Yet another embodiment of these techniques is a method for customizing presentation of navigation directions in mapping applications. The method includes obtaining navigation instructions which direct a user from a starting point to a destination, receiving, for each navigation instruction, a selection of an instruction-specific presentation rule, and causing the navigation instructions to be provided to a client device in accordance with the instruction-specific presentation rule for each navigation instruction via a communication link.

BRIEF DESCRIPTION OF THE DRAWINGS

FIG. 4 illustrates an example user interface which allows a user to select instruction-specific presentation rules for generating customizable presentation of navigation directions;

DETAILED DESCRIPTION

Overview

Generally speaking, techniques for providing navigation instructions according to instruction-specific presentation rules can be implemented in navigation system operating in a portable computing device, a non-portable computing device, one or several network servers, a head unit of a vehicle or a system that includes a combination of these devices. However, for clarity, the examples below focus primarily on an embodiment in which a user generates a request for navigation directions on a portable computing device, and, in response, a navigation data server generates navigation instructions and sends these instructions to the portable computing device. The portable computing device displays the navigation instructions on a user interface which allows the user to create a "playlist," that specifies how each navigation instruction should be presented according to one or more instruction-specific presentation rules (or simply "presentation rules"). The portable computing device then presents the navigation instructions according to the presentation rules via a local display device, speaker, etc., or via the audio/visual components of the head unit.

In other implementations, the techniques for generating navigation instructions can be implemented on the portable computing device. In yet other implementations, the techniques for creating a playlist can be implemented on another computing device, and the playlist can be transmitted to the client computing device. The playlist may be created on another computing device and played back on the head unit where the client computing device acts as an intermediary by obtaining the playlist and causing the navigation instructions to be played back according to the presentation rules on the head unit.

Generally speaking, the examples below describe two stages for providing customizable presentation of navigation directions: 1) configuration and 2) presentation. Configuration includes displaying the navigation instructions in some suitable format on the portable device or on another computing device for the user to specify instruction-specific presentation rules, and for the navigation system to create a playlist based on these rules. Configuration may occur prior to beginning the navigation session (e.g., before the user departs from the starting point). During the presentation stage, the system presents an instruction in accordance with the presentation rule as the user approaches a location corresponding to the navigation instruction. For example, if the navigation instruction is "Turn right onto Highway 94," playback does not occur until the user has completed the previous instruction and is approaching Highway 94. The two stages may be referred to herein as "the configuration stage" and "the playback stage."

Example Hardware and Software Components

Figure 1:
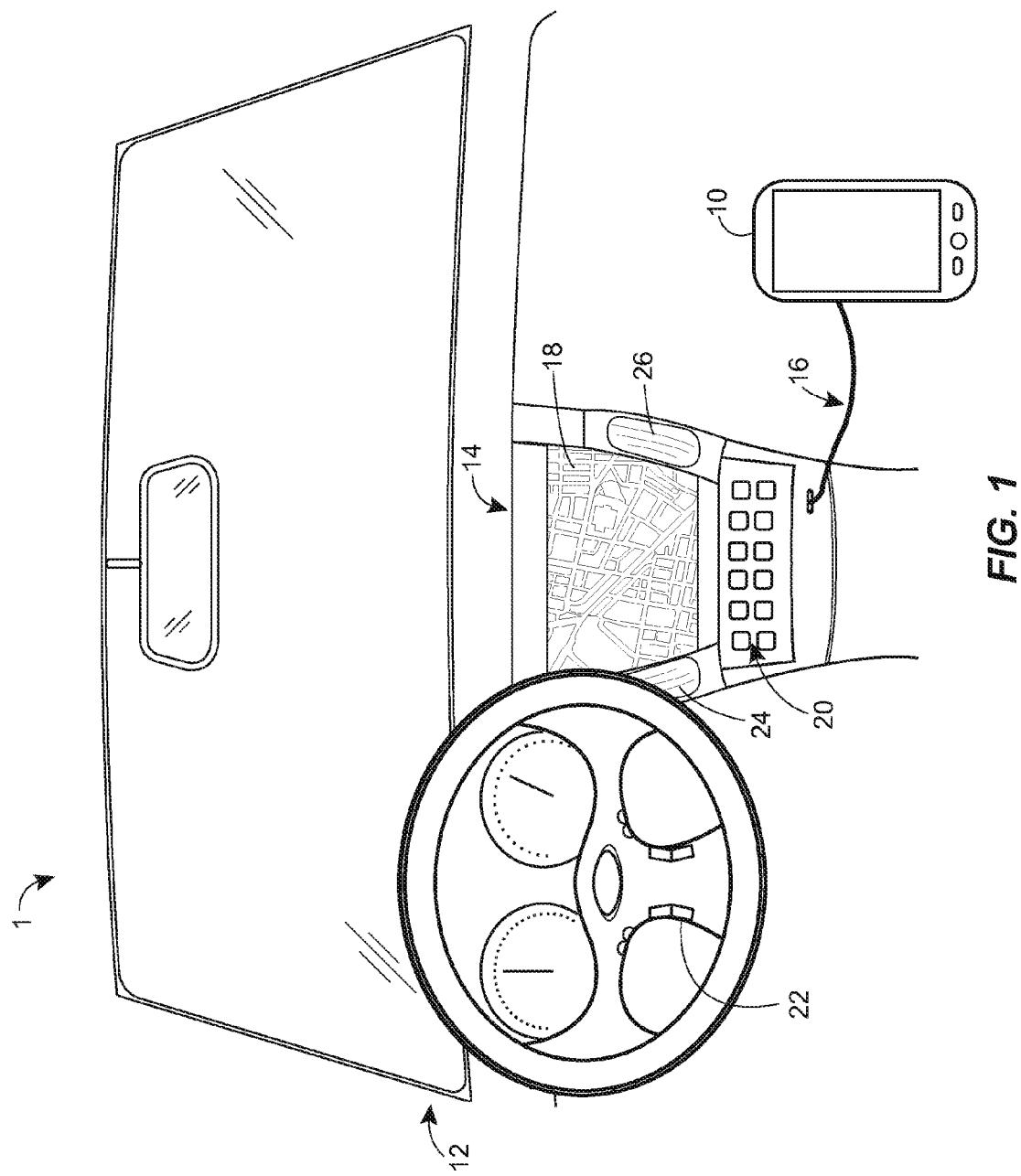
FIG. 1 illustrates an example automotive environment in which the techniques of the present disclosure can be used to generate customizable presentation of navigation directions.

Referring to FIG. 1, an example environment 1 in which the techniques outlined above can be implemented includes a portable device 10 and a vehicle 12 with a head unit 14. The portable device 10 may be a smart phone or a tablet computer, for example. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fourth- or third-generation cellular network (4G or 3G, respectively).

In operation, during the configuration stage, the portable device 10 obtains navigation data to navigate the driver from point A to point B in the form of a sequence of navigation instructions or maneuvers. As discussed in more detail below, the portable device 10 can receive navigation data via a communication network from a navigation service or can generate navigation data locally, depending on the implementation. The portable device 10 displays the navigation instructions and the user can create a playlist before the user arrives at point A, by specifying a presentation rule for each navigation instruction. For example, the user can select a presentation rule which causes the portable device 10 to omit playback of a navigation instruction. As another example, the user can select a presentation rule which causes the portable device 10 to playback the navigation instruction more than once, and the user can specify the number of times for playing back the navigation instruction.

During the playback stage, the portable device 10 presents audio and/or visual instructions corresponding to the navigation instructions according to the user's selected presentation rules. The audio and/or visual instructions are presented once the user arrives at each location corresponding to each respective navigation instruction (e.g., the location of the maneuver described by the navigation instruction). In other embodiments, the portable device 10 causes the audio and/or visual instructions to be provided to a head unit 14 of a vehicle.

The head unit 14 can include a display 18 for presenting navigation information such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play the audio instructions sent from the portable device 10, and the display can be used to play the visual instructions sent from the portable device 10.

Figure 2:
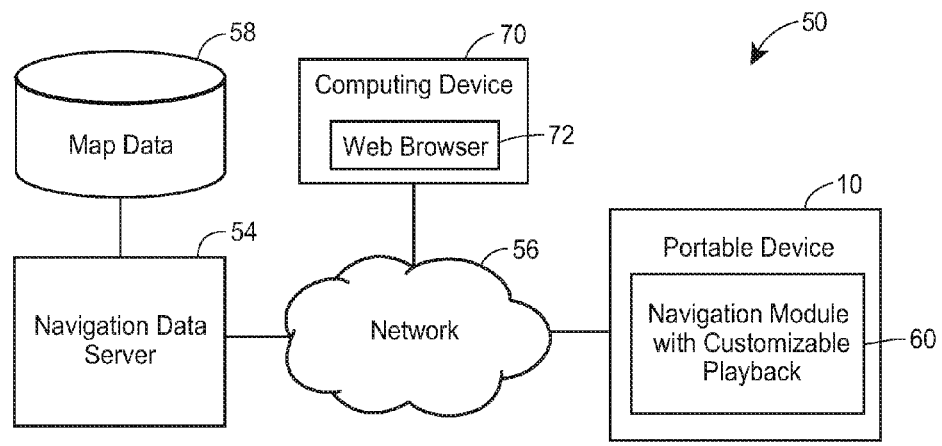
FIG. 2 illustrates a block diagram of an example communication system in which techniques for generating customizable presentation of navigation directions can be implemented.

FIG. 2 depicts an example system 50 for customizing presentation of navigation instructions using a user-defined playlist. Depending on the implementation, the portable device 10 can be, for example, a smartphone, a tablet computer, a wearable computing device, etc. The portable device 10 is coupled to another computing device 70 via a communication network 56, which can be any suitable local or wide area network including the Internet. The other computing device 70 can be, for example, a desktop computer or a laptop computer which includes a web browser 72. The portable device 10 is also coupled to a navigation data server 54 via the communication network 56. The navigation data server 54 is coupled to a map database 58.

In operation, during the configuration stage, the navigation data server 54 can receive a request for navigation directions for navigating to a specified destination and generate, using street and road data stored in the map database 58, step-by-step navigation instructions. The portable device 10 implements a navigation module with customizable playback 60 that receives the step-by-step navigation instructions from the navigation data server 54, displays the step-by-step navigation instructions, and allows the user to specify a presentation rule via one or more user controls for visual and/or auditory presentation of each instruction included in the step-by-step navigation instructions. In the playback stage, the portable device 10 generates visual information related to the instruction by rendering a digital map, displaying a route as an overlay, displaying text, etc. and/or auditory information related to the instruction by generating a voice announcement using suitable text-to-speech (TSS) technology, in accordance with the selected presentation rules. In some implementations, information related to an instruction can also include a vibratory signal and/or other signals.

In other implementations, the portable device 10 can store navigation and/or map data in a local memory or on peripheral storage device such as an optical disk. In yet other implementations, the module 60 can be implemented in the navigation data server 54 or distributed between the navigation data server 54 and the portable device 10. Further, generation of map images and voice announcements generally can be implemented on the portable device 10, on the navigation data server 54, partially on both, or on another server.

Moreover, in other implementations, the other computing device 70 can receive the step-by-step navigation instructions from the navigation data server 54 and display them on the web browser 72. The user can login to a user profile maintained by an online service that provides navigation data, for example. The user may create a playlist of the step-by-step navigation instructions by selecting instruction-specific presentation rules. The online service may then allow the user to store the playlist. The playlist may be stored in an online storage service such as cloud storage. The user may login to the same user profile on the portable device 10, and the portable device 10 can retrieve the stored playlist for playback during the route.

Figure 3:
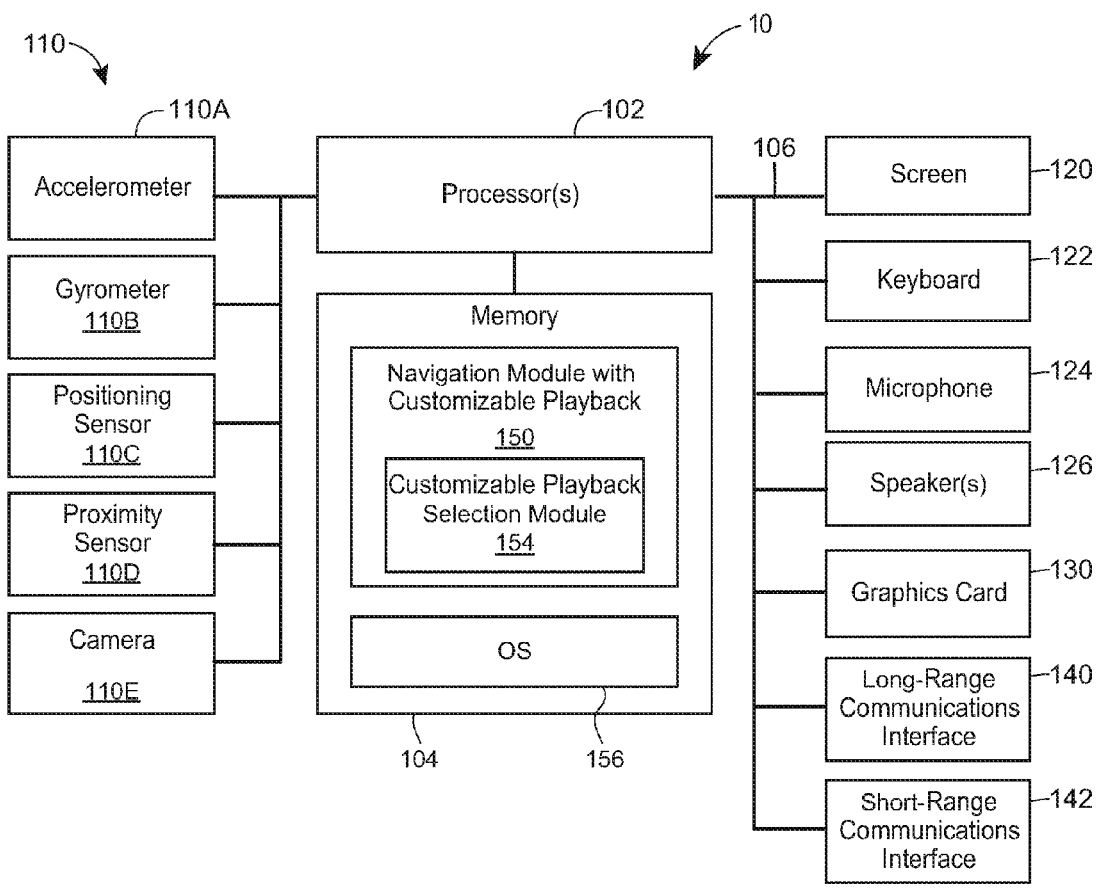
FIG. 3 illustrates a block diagram of an example portable user device that can operate in the system of FIG. 2.

The portable device 10 is described in more detail with reference to FIG. 3. Referring to FIG. 3, an example portable device 10 includes one or more processors 102 coupled to a memory 104. Each of the one or more processors 102 can be any suitable general-purpose processing unit (e.g., a CPU), a microprocessor, or an application-specific processing unit. The memory 104 can a non-transitory computer-readable medium that can include persistent components such as a hard disk, a flash drive, etc. and non-persistent components such as a random access memory (RAM) unit. The processor(s) 102 and the memory 104 can be interconnected via a suitable electrical connection such as a digital bus 106, for example.

The portable device 10 further includes a set of sensors 110 that includes, in this example configuration, an accelerometer 110A and a gyrometer 110B to generate signals indicative of the orientation of the portable device 10 in three-dimensional space, a positioning sensor 110C such as a global positioning service (GPS) module, a proximity sensor 110D, and one or more cameras 110E. The memory 104 can store the corresponding drivers to process the signals from the sensors 110 and determine various characteristics of the portable device 10. In other implementations, the sensors 110 can include additional sensors such as a digital compass to better or more quickly estimate the current orientation of the portable device 10, a barometer to more quickly estimate the current altitude of the portable device 10, a light sensor to measure the amount of ambient light, etc. Conversely, the portable device 10 in some implementations does not include all of the sensors 110 illustrated in FIG. 3.

The portable device 10 also can include devices configured to receive user input and provide output to a user. The portable device 10 can include a visual interface such as a screen 120, a screen external to the portable device 10, or any other component or a set of components for generating a visual presentation of data. In some implementations, the screen 120 is a touchscreen configured to both provide output and receive input. The audio interface of the portable device 10 can include one or more speaker(s) 126 or other suitable devices internal or external to the portable device 10. Further, input devices of the portable device 10 can include a keyboard 122 and a microphone 124. More generally, the portable device 10 can include any suitable input and output devices in addition to, or instead of, the modules 120-126 illustrated in FIG. 3.

In an example implementation, the portable device 10 further includes a graphics card 130 to efficiently render graphics content such as interactive digital maps, for example. Further, the portable device 10 includes a long-range communication interface 140 that can support wired and/or wireless communications and a short-range communication interface 142 that also can support wired and/or wireless communications. For example, the short-range communication interface 142 can be a Universal Serial Bus (USB) link.

The memory 104 stores a navigation module with customizable playback 150 as a set of instructions executable on the one or more processors(s) 102, for example. In various embodiments, the module 150 is implemented as an independent application, an extension of another application such as a web browser, as a script interpreted by a web browser or another application, etc. The module 150 includes a customizable playback selection module 154. The memory 104 also can store various parameters of the module 150 as well as data used by other software components.

With continued reference to FIG. 3, the memory 104 can store instructions that implement an operating system (OS) 156 as well as instructions that implement various applications, services, drivers, etc. (not shown). The OS 156 can provide application programming interfaces (API) to access various functions of the portable device 10. As one example, the OS 156 can process input from the sensors 110, determines various characteristics and parameters of the portable device 10 (such as the current location, orientation, speed of travel), and provide access to these characteristics via a set of APIs to software applications including the navigation module with customizable playback 150. The module 150 can be generally similar to the module 60 of FIG. 2.

In operation, the navigation module with customizable playback 150 can receive a request for navigation directions from a user via the keyboard 122, the microphone 124, or the screen 120 (if implemented as a touchscreen). In some embodiments, with reference to FIG. 1, a user can request navigation directions from the head unit 14 which may be communicated to the portable device 10 over the short-range communication interface 142. The navigation directions may be requested via the software keyboard on the display 18, the hardware input controls 20 and 22 or the microphone 24. The module 150 can obtain navigation directions from a network server (such as the navigation data server 54) as a series of navigation instructions and provide these navigation instructions to the user via the output devices such as the screen 120. When the portable device 10 is being used in a vehicle, the module 150 can provide some or all of the output to the head unit of the vehicle via the short-range communication interface 142.

The customizable playback selection module 154 displays one or more instruction-specific presentation rule user controls, which are individually controllable, for each navigation instruction on the screen. For example, the customizable playback selection module 154 may include user controls for selecting to playback the navigation instruction, not to playback the navigation instruction, and to playback the navigation instruction multiple times as well as a user control to select the number of times the navigation instruction is played back. Moreover, the customizable playback selection module 154 may include user controls for selecting audio playback only of the navigation instruction, visual playback only, and both visual and audio playback of the navigation instruction.

Additionally, there may be a user control to select the length of a navigation instruction. The user may choose to have the navigation instruction played back in full, or alternatively may choose to playback a portion of the navigation instruction. For example, if the navigation instruction is "In 300 meters, take the 1st left onto Main Street," and the user chooses a length of one-half, the played back instruction may be "Take the $1^{st}$ left onto Main Street." If the user chooses a length of one-quarter, the played back instruction may be "Turn left onto Main Street."

Moreover, the customizable playback selection module 154 may include a user control to condense multiple navigation instructions into a single uninterrupted instruction during playback. For example, if there are several instructions which can be combined to direct the driver to "Highway 94," the user can select a user control to combine the several navigation instructions to form a single instruction during playback such as, "Start out going East and turn right onto Highway 94."

The user can select one or more presentation rules for each navigation instruction. Moreover, the customizable playback selection module 154 may include a default presentation rule for when the user does not make a selection. For example, the default rule may be not to playback the navigation instruction. Once the customizable playback selection module 154, receives instruction-specific presentation rules for each navigation instruction, a playlist created by the presentation rules may be stored in the memory 104 of the portable device 10. In some embodiments, the playlist may be stored at the navigation data server 54 of FIG. 2, or an online storage service such as a cloud service. In any event, the navigation module with customizable playback 150 causes the portable device to playback the navigation instructions according to the selected rules during the playback stage. The playback may be audio and/or visual depending on the user's selections.

It is noted that although the examples above primarily focus on visual and auditory information, the techniques of this disclosure also can be used with vibrational output and, more generally, any other type of output.

FIG. 4 illustrates an example user interface 200 for displaying navigation instructions and creating the playlist during the configuration stage. With reference to FIG. 2, the user interface 200 may be displayed on the portable device 10 or the web browser 72 of the other computing device 70. The user interface 200 displays a list of navigation instructions 202-218 directing a user from North Sydney to Manly; two suburbs of Australia. Each navigation instruction describes a maneuver which occurs at a location. For example, the second navigation instruction 204 describes turning left at the intersection of Miller Street and Pacific Highway. Each navigation instruction also includes an indication of a distance until the next maneuver. For example, the second navigation instruction 204 indicates that the user will travel 210 meters on Pacific Highway before arriving at a location for the next navigation instruction 206.

Moreover, the user interface 200 includes several options via one or more individually controllable user controls, which enable a user to select one or more presentation rules for each navigation instruction. For example, the user interface 200 includes an indication of whether or not to playback each navigation instruction in an audio format 230 during the playback stage (also referred to herein as "audio playback"). When the user selects a user control to playback a navigation instruction the indication is highlighted. For example, the user has selected the first navigation instruction 202, the second navigation instruction 204 and the navigation fourth instruction 208 for audio playback. According to the user interface 200, all other navigation instructions in the list will not be played back during the playback stage. In some embodiments, an indication may be displayed in some other manner to show it has been selected. Moreover, some embodiments may include an indication of whether or not to playback each navigation instruction in a visual format (not shown) during the playback stage (also referred to herein as "visual playback"). The user interface 200 also includes a "Select all" user control 250 for allowing the user to select the entire list of navigation instructions. Each of the indications may be selected via user controls by clicking on a mouse, or in the case of a touchscreen, tapping a finger on the display, or in any other suitable manner. If the user does not make a selection for a navigation instruction, a default option may be not to playback the navigation instruction during the playback stage.

The user interface 200 also includes a user control for the number of times to playback an audio instruction 240. For example, the indication "X2" 242 associated with the second instruction 204, suggests that audio for the second instruction 204 will be played twice during the playback stage. Both times will occur after the user completes the maneuver corresponding to the first instruction 202 ("the starting location") and before the user completes the maneuver corresponding to the second instruction 204 ("the ending location"). Consequently, the number of times determine the timing for playing back the navigation instruction. For example, a navigation instruction configured to be played twice during the playback stage may be played once at the starting location and again at the ending location. A navigation instruction configured to be played three times during the playback stage may be played an additional time halfway between the starting location and the ending location. While the user interface 200 indicates the second instruction 204 will be played twice, a user can select any number of times to play each instruction. The number of times may be selected via user controls by typing a number, scrolling on a scroll bar, clicking on a mouse where the number of mouse clicks corresponds to the number of times selected, tapping a finger on the display where the number of taps corresponds to the number of times selected, or in any other suitable manner.

In addition to indicating whether or not to play a navigation instruction and the number of times to play the instruction, the user interface 200 may also include a user control for the length of time for playing each navigation instruction. For example, each navigation instruction may include an associated horizontal or vertical slider bar on the user interface 200, where the opposite ends of the slider bar indicate a minimum and a maximum length for the navigation instruction. The user can select the length by adjusting the slider bar. When the user selects the maximum length, the entire navigation instruction listed on the user interface 200 may be played back during the playback stage. On the other hand, when the user selects a length that is less than the maximum, some portion of the navigation instruction listed on the user interface 200 may be played back during the playback stage. In some embodiments, the length of the navigation instruction is not controlled by a slider bar and may be controlled in some other suitable manner. More generally, the user interface 200 can include any suitable control for selecting the level of detail for an instruction. In one alternative implementation, the user interface 200 provides a pull-down list of the available levels of detail (e.g., normal, low, and high) for each of the instructions.

Further, the user interface 200 may also include a user control for condensing multiple navigation instructions into a single uninterrupted instruction during the playback stage. For example, the user may click and drag one navigation instruction into another navigation instruction to combine the two. In the case of a touchscreen a user may pinch the two instructions together. For example, the user may click and drag the second navigation instruction, "Take the 1st left onto Pacific Highway" 204 into the first navigation instruction, "Head south on Miller Street towards Pacific Highway" 202, so that the condensed navigation instruction during the playback stage is "Head south on Miller Street and take the 1st left onto Pacific Highway." The condensed instruction may be indicated on the user interface by including the condensed instruction in the list of navigation instructions, and allowing a user to expand the condensed instruction to the original navigation instructions. In other embodiments, the condensed instruction may be indicated in any other suitable manner.

After the playlist is created, the user may store the playlist on the portable device 10, on the navigation data server 54 of FIG. 2, or on an online storage service such as cloud storage, for later retrieval when the user arrives at the starting point. During the playback stage, each navigation instruction is played back according to the presentation rules selected by the user while creating the playlist.

When audio playback is selected for a navigation instruction, a voice announcement is generated using suitable TSS technology and played through the speakers of the portable device 126 or the head unit 26. The voice announcement may be generated several times for the same navigation instruction or may be a shorter voice announcement than the corresponding text of the navigation instruction (e.g., if the user selects a shorter length or condenses a navigation instruction). When visual playback is selected for a navigation instruction, a digital map may be rendered, and the route may be displayed as an overlay on the screen 120 of the portable device or the display 18 on the head unit. In addition, text may be displayed on the digital map corresponding to the navigation instruction and according to the selected presentation rules. When both audio and visual playback are selected for a navigation instruction, both a voice announcement corresponding to the navigation instruction is generated and text corresponding to the navigation instruction is displayed.

Figure 5:
FIG. 5 illustrates an example digital map and a navigation route for which instruction-specific presentation rules can be selected using the techniques of this disclosure.

FIG. 5 illustrates a portion of a highly simplified digital map and navigation directions 300 from North Sidney to Manly based on the navigation instructions in the user interface 200 of FIG. 4. For simplicity, labels are omitted from the map of FIG. 5. The map and navigation directions 300 may be displayed on the portable device 10 or on the head unit 14. When a user arrives at the starting point 302, North Sydney, the playback stage for providing customizable playback of navigation directions begins. During the playback stage, each of the navigation instructions are played back according to their corresponding instruction-specific presentation rules. A navigation instruction may be played back from the point in which the user makes the previous maneuver ("the starting location") until the point in which the user arrives at the location corresponding to the maneuver for the navigation instruction and completes the maneuver ("the ending location"). For example, when audio playback is selected for a navigation instruction, a voice announcement may be generated when the user arrives at the starting location until the user continues on past the ending location. If the user selects audio playback multiple times for the navigation instruction, the voice announcement may be generated a corresponding number of times until the user passes the ending location. On the other hand, when visual playback is selected for a navigation instruction, text describing the navigation instruction may be displayed on the map 300 until the user passes the ending location.

According to the user selections from user interface 200 of FIG. 4 during the configuration stage, audio playback is selected for the first instruction 202. Once the user begins heading south on Miller Street, the second navigation instruction 204 is played back. Because the user selected audio playback twice for the second navigation instruction 204, a voice announcement is generated twice corresponding to the navigation instruction until the user passes the ending location by turning left onto Pacific Highway 304. After the user turns onto Pacific Highway, the third instruction 206 is not played back according to the presentation rule selected on the user interface 200. As a result, a voice announcement is not generated and text describing the navigation instruction is not displayed on the map. The playback stage continues in a similar manner until the user arrives at the destination, Manly. As mentioned above, the instruction-specific presentation rules are not limited to whether or not to playback a navigation instruction. Instead, the presentation rules may indicate to playback a shortened version of the navigation instruction, a condensed version of multiple navigation instructions, etc.

Figure 6:
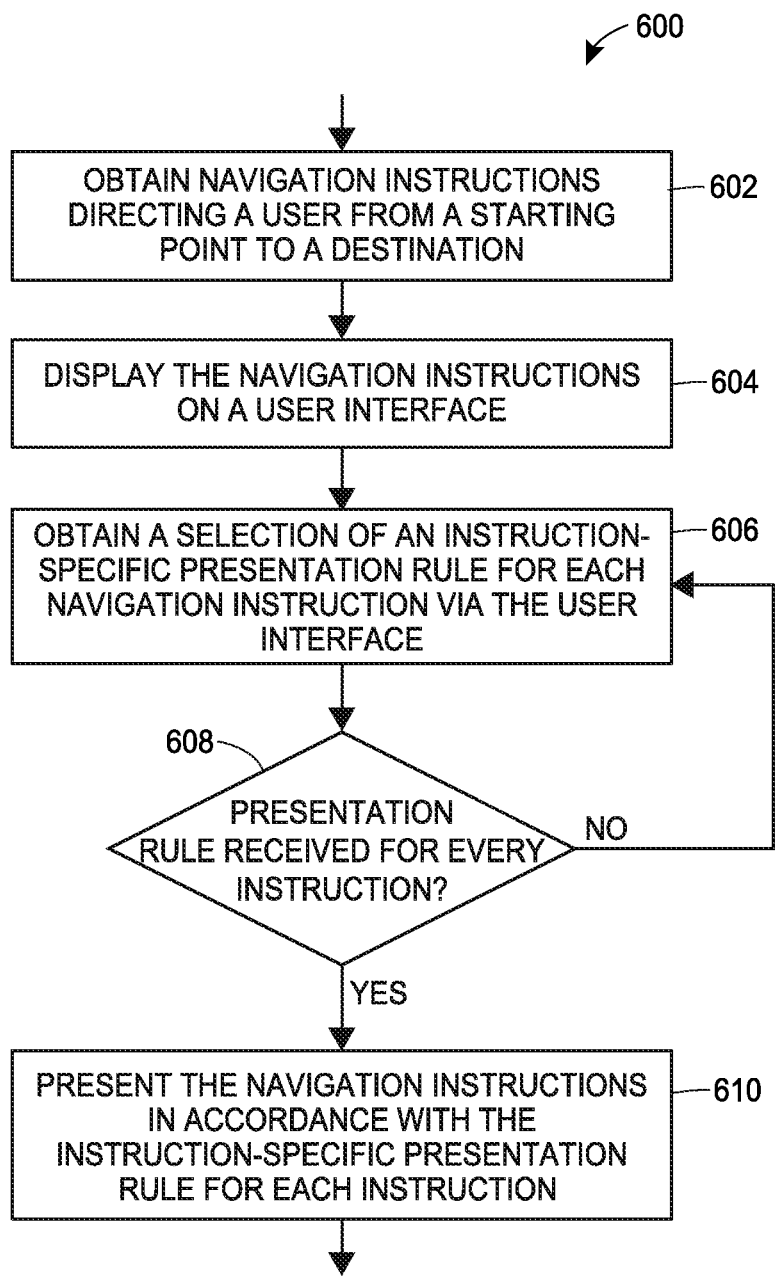
FIG. 6 is a flow diagram of an example method for providing customizable presentation of navigation directions at a client computing device.

FIG. 6 illustrates a flow diagram of an example method 600 for providing customizable playback of navigation directions at the portable device of FIG. 3. At block 602, navigation instructions directing a user from a starting point to a destination are obtained. Each navigation instruction displayed describes a maneuver which occurs at a location. The navigation instructions may be obtained based on the user's request or may be obtained automatically. Moreover, the user may specify the starting point and the destination for the navigation instructions or the user may only specify the destination. The starting point may be automatically determined based on the user's current location or in some other manner. In some embodiments, a user may request navigation directions at the portable device 10, and the portable device may transmit the request to the navigation data server 54 of FIG. 2. The navigation data server 54 may then generate the navigation instructions and transmit them to the portable device 10 or the other computing device 70.

The navigation instructions are then displayed on a user interface during the configuration stage (block 604). The user interface may be on the portable device 10 or the other computing device 70. Also displayed on the user interface are several presentation rule options. For example, next to each navigation instruction, the user interface may display user controls allowing the user to select audio playback, visual playback, no playback, a number of times for playback, a length of the navigation instruction for playback, a condensed version of multiple navigation instructions into one navigation instruction for playback, etc.

At block 606, a selection of an instruction-specific presentation rule for each navigation instruction is obtained via the user interface. In some embodiments, a user may select multiple presentation-rules for a single navigation instruction. For example, the user may select audio playback as well as a shortened version of the navigation instruction. Moreover, the instruction-specific presentation rules may include a default rule such as, for example, no playback if the user does not select a presentation rule for a navigation instruction.

At block 608, the method 600 determines whether a presentation rule has been received for every navigation instruction. If not, the method 600 repeats block 606 until every navigation instruction has a corresponding presentation rule. In some embodiments, when the user does not select a presentation rule for a navigation instruction, a default rule is automatically selected as mentioned above. In this case, the method 600 may repeat block 606 until the user confirms all selections have been made, (e.g., by selecting a "Submit" option on the user interface). In other embodiments, the method 600 may repeat block 606 until the user arrives at the starting point for the navigation instructions and the playback stage begins. In any event, once the method 600 determines a presentation rules has been received for every navigation instruction, a playlist corresponding to the presentation rules is stored at the portable device 10, the navigation data server 54 or an online storage system such as cloud storage.

At block 610, the playback stage begins, and the navigation instructions are presented in accordance with the instruction-specific presentation rule for each navigation instruction. For example, a voice announcement for a navigation instruction may be generated as the user approaches a location for the maneuver corresponding to the navigation instruction. The navigation instructions may be presented on the speakers 126 and/or the screen 120 of the portable device 10. Alternatively, the navigation instructions may be presented on the speakers 26 or the display 18 of the head unit 14. The navigation instructions are presented during the playback stage until the user arrives at the destination.

Figure 7:
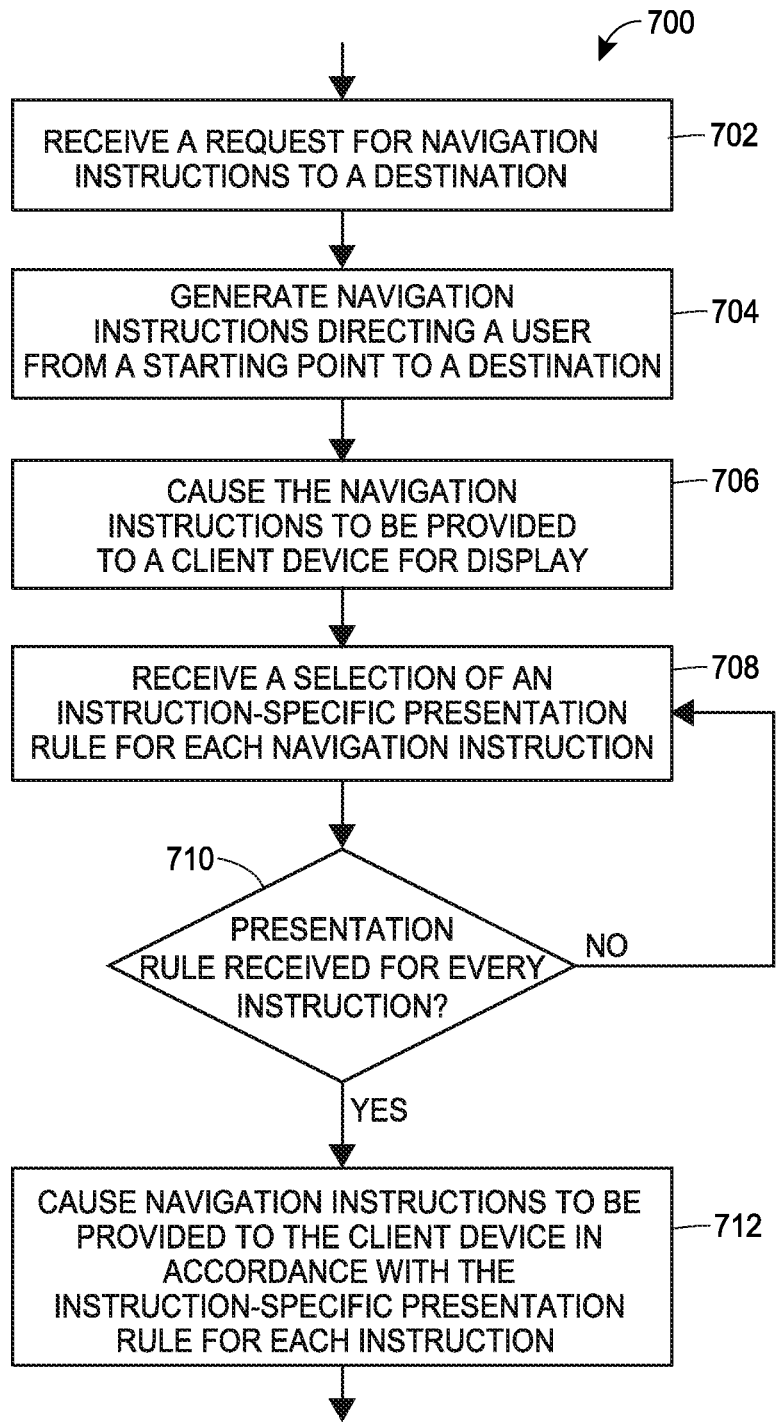
FIG. 7 is a flow diagram of an example method for generating customizable presentation of navigation directions at a navigation data server.

FIG. 7 illustrates a flow diagram of an example method 700 for providing customizable playback of navigation directions at the navigation data server 54 of FIG. 2. At block 702, a request for navigation instructions to a destination is received. The request may be transmitted from portable device 10 or the other computing device 70. In response, navigation instructions are generated direction a user from a starting point to a destination (block 704). The user may select the starting point, or the starting point may be determined based on the user's current location or in some other manner.

The navigation instructions are then provided to a client device for display (block 706). The client device may be the device from which the request for navigation instructions was received, i.e., the portable device 10 or the other computing device 70.

At block 708, a selection of instruction-specific presentation rules for every navigation instruction are received. The method 700 then repeats block 708 until an instruction specific presentation rule has been received for every navigation instruction (block 710). In some embodiments, multiple presentation-rules for a single navigation instruction are received. Moreover, in some embodiments, when the user does not select a presentation rule for a navigation instruction, a default rule is automatically received as mentioned above. In this case, the method 700 may repeat block 708 until receiving confirmation from the user that all selections have been made, (e.g., by receiving a selection of a "Submit" option on the user interface). In other embodiments, the method 700 may repeat block 708 until the user arrives at the starting point for the navigation instructions and the playback stage begins. In any event, once the method 700 receives a presentation rule for every navigation instruction, a playlist corresponding to the presentation rules is stored at the portable device 10, the navigation data server 54 or an online storage system such as cloud storage.

Then at block 712, the navigation instructions in accordance with the instruction-specific presentation rules are provided to the portable device 10 for playback. For example, a voice announcement for a navigation instruction may be generated at the navigation data server 54 as the user approaches a location for the maneuver corresponding to the navigation instruction.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for presenting navigation directions based on a user playlist through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for customizing presentation of navigation directions, the method comprising:

obtaining, at one or more processors, a plurality of navigation instructions which direct a user from a starting point to a destination;

displaying, by the one or more processors, the plurality of navigation instructions via a user interface;

providing, by the one or more processors to the user for each of the plurality of navigation instructions, a separate, individually operable user control for specifying an instruction-specific presentation rule, via the user interface, the instruction-specific presentation rule specifying a manner in which a corresponding navigation instruction is presented to the user, wherein the separate, individually operable user control includes (i) a first option to select a number of times the corresponding navigation instruction is repeated and (ii) a second option to select at least another one of the plurality of navigation instructions to combine with the corresponding navigation instruction into a single navigation instruction;

prior to the user departing from the starting point toward the destination, receiving, by the one or more processors from the user interface, instruction-specific presentation rules, in accordance with which the plurality of navigation instructions is presented during navigation, wherein at least two navigation instructions correspond to different instruction-specific presentation rules; and when the user departs from the starting point toward the destination, providing, by the one or more processors to the user, each of the plurality of navigation instructions in accordance with the instruction-specific presentation rule for the corresponding navigation instruction as the user approaches a location corresponding to the navigation instruction, wherein at least some of the plurality of navigation instructions are presented audibly or visually.

2. The method of claim 1, wherein the separate, individually operable user control further allows the user to select whether the corresponding navigation instruction is to be presented audibly.

3. The method of claim 1, wherein the separate, individually operable user control further allows the user to select whether the corresponding navigation instruction is to be presented visually.

4. The method of claim 1, wherein the separate, individually operable user control further allows the user to select a desired one of a plurality of levels of detail for the corresponding navigation instruction.

5. The method of claim 1, wherein:
the one or more processors are in a first computing device; and
the displaying, the providing, and the receiving are implemented in an interactive web page displayed on the first computing device, the method further comprising:
causing the plurality of navigation instructions to be presented via a second, portable computing device different from the first computing device during navigation in accordance with the instruction-specific presentation rules.

6. The method of claim 1, further comprising:
providing, for each of the plurality of navigation instructions, a default selection for the corresponding separate, individually operable user control;
wherein receiving the instruction-specific presentation rules includes receiving non-default selections for at least some of the plurality of navigation instructions.

7. A client device comprising:
a user interface;
one or more processors coupled to the user interface; and
a non-transitory computer-readable memory coupled to the one or more processors and storing thereon instructions that, when executed by the one or more processors, cause the client device to:
obtain a plurality of navigation instructions which direct a user from a starting point to a destination;
provide, for each of the plurality of navigation instructions to the user, a set of individually operable user controls for specifying an instruction-specific presentation rule, via the user interface, the instruction-specific presentation rule specifying a manner in which a corresponding navigation instruction is presented to the user, wherein the set of individually operable user controls includes (i) a first option to select a number of times the corresponding navigation instruction is repeated and (ii) a second option to select at least another one of the plurality of navigation instructions to combine with the corresponding navigation instruction into a single navigation instruction;
receive, via the user interface, a plurality of instruction-specific presentation rules for the plurality of navigation instructions, wherein at least two navigation instructions correspond to different instruction-specific presentation rules; and
when the user departs from the starting point toward the destination, present, via the user interface, each of the plurality of navigation instructions in accordance with the received instruction-specific presentation rule for the corresponding navigation instruction as the user approaches a location corresponding to the navigation instruction, wherein at least some of the plurality of navigation instructions are presented audibly or visually.

8. The client device of claim 7, wherein the set of individually operable controls further includes a control that allows a user to select whether the corresponding navigation instruction is to be presented audibly.

9. The client device of claim 7, wherein the set of individually operable controls further includes a control that allows a user to select whether the corresponding navigation instruction is to be presented visually.

10. The client device of claim 7, wherein the set of individually operable controls further includes a control that allows a user to select a desired one of a plurality of levels of detail for the corresponding navigation instruction.

11. A method for customizing presentation of navigation directions in mapping applications, the method comprising:
obtaining, at one or more computing devices, a plurality of navigation instructions which direct a user from a starting point to a destination;
for each navigation instruction of the plurality of navigation instructions:
providing, by the one or more computing devices, a web interface to the user including individually operable user controls for specifying an instruction-specific presentation rule, the instruction-specific presentation rule specifying a manner in which a corresponding navigation instruction is presented to the user, wherein the individually operable user controls include (i) a first option to select a number of times the corresponding navigation instruction is repeated and (ii) a second option to select at least another one of the plurality of navigation instructions to combine with the corresponding navigation instruction into a single navigation instruction; and
receiving, at the one or more computing devices, a selection of an instruction-specific presentation rule, wherein at least two navigation instructions correspond to different instruction-specific presentation rules; and
causing, by the one or more computing devices, the plurality of navigation instructions to be provided to a client device in accordance with the instruction-specific presentation rule for each navigation instruction via a communication link, wherein when the user departs from the starting point toward the destination at least some of the plurality of navigation instructions are presented audibly or visually by the client device as the user approaches a location corresponding to each of the at least some navigation instructions.

12. The method of claim 11, further comprising receiving selections of the instruction-specific presentation rules for all of the plurality of navigation instructions prior to the user departing from the starting point toward the destination.

13. The method of claim 11, wherein the individually operable user controls further include, for each of the plurality of navigation instructions, one or more of:
a first control for specifying whether the navigation instruction should be presented audibly,
a second control for specifying whether the navigation instruction should be presented visually, and
a third control for specifying a level of detail at which the navigation instruction should be presented.

* * * * *